Dec. 8, 1970 R. G. OLSSON 3,545,854

SEMICONDUCTOR MASK MAKING

Filed June 17, 1966 2 Sheets-Sheet 1

INVENTOR
RAYMOND G. OLSSON

BY Robert J. Mooney
ATTORNEYS

INVENTOR
RAYMOND G. OLSSON
BY Robert J. Mooney
ATTORNEYS

United States Patent Office 3,545,854
Patented Dec. 8, 1970

3,545,854
SEMICONDUCTOR MASK MAKING
Raymond G. Olsson, Jamesville, N.Y., assignor to General Electric Company, a corporation of New York
Filed June 17, 1966, Ser. No. 558,386
Int. Cl. G03b 27/44
U.S. Cl. 355—46 20 Claims

ABSTRACT OF THE DISCLOSURE

An optical system for simultaneously producing a plurality of identical, extended area images of an object. The extended area images of the object are focused onto an image plane by a plurality of identical zone plate diffraction gratings, each comprising alternate opaque and transparent concentric zones disposed normal to an axis of the system.

This invention relates to a novel method and optical apparatus for simultaneously producing a plurality of substantially identical, extremely small images accurately representing a prepared object pattern, and has particular utility in the making of photographic masks for use in the production of semiconductor devices including integrated circuits.

When making semiconductors or integrated circuitry using photo-resist techniques, for instance of a type such as that illustrated in Pat. 3,122,817 to Andrus, an object pattern is usually prepared by hand and then reduced down in size until its photographic image approaches the dimensions desired at the surface of the mask or of the actual substrate to which it is to be applied. Such reduction easily produces one image which is sharply defined within the limitations of the optical system, but it is extremely difficult to simultaneously produce a very large number of such images side-by-side in an image plane such that the images are all close together, are of equal resolution and equal size, and all have positional registry which is fully reproducible when a different object pattern is substituted during a later step in the process. In present systems, the resolution in a one-inch square mask is such as to make practical line-widths at the image of .15 mil, but semiconductor techniques also make desirable even greater registration accuracy during successive exposures to different patterns used in the manufacturing process.

In order to manufacture semiconductor devices or integrated circuits economically, it is desirable to make hundreds of them at a time, thereby requiring an array of hundreds of substantially-idential images. Various processes are known for producing such plural images, but the known processes have always required objectionable compromises between image resolution and image registration (reproducibility), thus sacrificing one or the other.

Two basic approaches have been used heretofore in attempts to attain multiple images of the desired quality: (1) The finest available lens system is used to reduce a large pattern to the desired image size, and then this lens system is laterally displaced step-by-step to produce multiple adjacent images arranged in rows and columns on the same photographic mask. This is known as a "step-and-repeat" process, in which each image has excellent resolution, but in which image registration between successive patterns is relatively poor. (2) The second approach employs an array of lenses mounted in the same plane on a singe plate and including a separate lens for each of the desired multiple images, which lenses then focus their respective reduced images of the common pattern onto an image plane to thereby produce side-by-side images of the pattern corresponding with each lens in the array.

This multiple lens approach provides better registration than the step-and-repeat system during successive steps of an over-all process of manufacture which requires the successive use of different patterns in register with each other, provided that the same lens array is used to focus each successive pattern and provided the lens array is dimensionally stable. However, in actual practice the registration of the individual images is poor and nonuniform because no way has been found to make hundreds of lenses of high quality all on a common plate which is dimensionally stable, for example a glass plate. The expedient of molding such an array into a plastic sheet has met with only limited success, not only as to lens quality and uniformity but also as to dimensional stability which governs image reproducibility and registration. Plastic changes shape with aging, with changes in its water vapor content, and with temperature, so that these images exhibit a degree of registration which varies with time and therefore is not truly reproducible. Moreover, although these images have good resolution in their centers, the resolution of each image falls off very rapidly away from its center due to edge effects of the lenses.

It had been proposed to use a plate having multiple pin holes therein such that each pin hole provides in the image plane a separate image representing a common object pattern, but although this approach seemed attractive from the point of view of ease of making the pinhole array, the array was incapable of resolving an object pattern into more than about 60 lines per millimeter, whereas the present state of the art is now about 400 lines/mm. In an effort to improve the resolving power of such arrays, the holes were made larger and a lens was introduced at each hole to focus the light on the image plane as discussed in the preceding paragraph. These lenses improve the resolving power to about 800 lines/mm. in the center of the image, but the resolving power falls off rapidly as points away from the center of the image are considered, and therefore each image has a large area of poor definition surrounding its central area.

It is a principal object of this invention to provide an improved approach of the general type using multiple focusing means comprising a common array arranged in such a way as to produce hundreds of substantially identical high-quality micro-images in a focal plane which may comprise either a photographic film which is later developed to provide a mask, or may comprise the photo-resist coated surface of a semiconductor slice or some other substrate surface to which the multiple images are to be directly applied, thereby eliminating the mask-making step per se.

The present invention presents a novel approach to the problem of making improved focusing arrays, and teaches the use of Fresnel or Soret zone-plate diffraction gratings for each focusing means in the array. This type of half-period grating has been known for many years to have certain focusing properties (see Robertson "Introduction to Optics," 4th edition, Chapters X and XI), but has not been considered useful in image-forming lens systems because of inadequate resolving power and angular coverage and because a refraction-type lens provides image contrasts which are about three orders of magnitude better than the zone plate.

This invention arises from the discovery that a zone plate can be made entirely satisfactory, and in fact superior to existing lens systems, in certain image-forming applications, and that an array of such zone plates can be made vastly superior to existing lens systems for simultaneously forming exactly registrable sets of such images. Where very small images are desired, a zone plate can be made particularly suitable as a focusing element to form such an image with excellent resolution, and an array of such zone plates is physically easily fabricated. For example, I have found that the simple zone plate functions well at .025″ outside diameter, with a resolving power of 400 lines per millimeter (i.e. live pairs) and its resolving power as well as the angular coverage of the area of high resolution behind it both can be made to increase as the zone plate diameter, and consequent center-to-center spacings of zone plates in an array, decrease.

In the present application where simultaneous exposure of a large number of semiconductor or integrated circuit substrates is the aim of the manufacturing process, and where all substrates must be photographically exposed sequentially to different image patterns, the degree of perfection with which the sequential patterns register with one another can be even more important than the fineness of the lines in the image of the pattern. If the array of focusing means is not fully stable in its dimensions, reproducibility of registration is degraded and becomes the limiting factor. Therefore, one principal advantage of the diffraction grating array over the refraction lens array resides in the fact that present novel techniques permit the producing of the complete grating array on a glass plate with excellent dimensional stability, whereas a prior art array can only be fabricated by known techniques from materials having poor stability, and even then the cost of fabrication of each array is very much greater. In order to make an array of hundreds of adjacent lenses on a common plate, only two basic techniques are available. Either these hundreds of lenses must be ground on the surface of a dimensionally stable plate, an impossible task at present, or the entire array must be molded in plastic. The latter expedient is currently in use, but the dimensional stability with time, temperature, humidity and mechanical support is relatively poor, and this fact, directly affects registration. Moreover, the quality of the individual molded lenses is not very high.

On the other hand, the present diffraction gratings are made with relative ease of photographing and etching opaque material deposited on a glass plate, the successive gratings being reduced and cast upon the common plate by a step-and-repeat optical system moving along predetermined coordinates. One present working embodiment of the invention employs a zone plate array covering an area of about 1.57 square inches, which array includes 2500 separate zone plates spaced on .025″ centers within that area and all lying in the plane of the glass plate surface. Slight positional errors between centers of the 2500 zone-plate gratings do not degrade ultimate image registration of successive object patterns because the successive patterns are respectively focused through the same zone-plate gratings, and therefore their relative positions coincide on successive exposures using different but related patterns. The glass zone-plate array is stable with time so that the focused images are fully reproducible once the object patterns are properly oriented with respect to the grating array, a relatively ease accomplishment.

Assuming constant resolving power, the angular coverage of a grating, i.e. the angle vertexed at the grating and subtended by the image, increases as the diameter and focal length are reduced together. For instance, in the case of an array in which the gratings are mutually tangent, the center-to-center distance between images substantially equals the diameter of the gratings. Therefore, as the grating focal lengths and diameters are reduced together (by simultaneously reducing the dimensions of the outer zone of each grating and the number of zones used while keeping constant the numerical aperture, or ratio of outer zone radius to grating focal length, and therefore keeping the resolving power constant) each grating is capable of covering the area behind itself with greater resolving power than would be obtained with a corresponding simple refractive lens of equal outside diameter. When a similar attempt is made to reduce the focal length of a simple refractive lens, the peripheral quality of the image becomes rapidly degraded. This means that in using an array of refractive lenses, for instance in making a checkerboard of images on a semiconductor slice which is later divided into individual pellets, only the central area of each pellet would have high resolution, and the surrounding area of the pellet would have rapidly decreasing resolution moving out from the center. On the other hand, gratings of the required physical dimensions minimize edge effects and provide much more uniform image quality over the full angular coverage of the grating. Known refraction techniques cannot provide analogous results on a practical basis.

With the complexity of the patterns increasing in integrated circuitry and semiconductor devices, and for technical reasons as well as economic mass-production reasons, the desirability of being able to focus greater numbers of images on a given image area increases all the time. Moreover, it is highly desirable to increase the overall area which can be exposed to images, and eventually to cover its entire surface, as distinguished from covering only limited zones opposite each of the individual focusing means and mutually separated by surrounding unusable zones. It is believed that substantial reduction or elimination of unused peripheral zones, i.e., the checkerboard effect, would be possible in a refractive lens array system only if each lens could be made to comprise a compound system of lenses. At any rate, future requirements will demand that the focusing means of an array be crowded closer together and eventually arranged to use the entire surface of the focusing array plate. Here again diffraction gratings can be relatively easily appplied to a coating on a glass plate so that its entire area is covered by grating lines, whereas the difficulty of making even a plastic lens array in which all of the array area is active to pass light enormously worsens an already very difficult fabrication problem.

The zone plate grating enjoys still another advantage over the refracting lens which contributes to its desirability in the present multiple-image application. In a lens, wide angular coverage is characterized by thick-center lens design which is virtually unattainable in a micro-lens array. It is believed that in present lens arrays, the minimum practical center-to-center lens spacing is about thirty mils. However, with known techniques it is foreseeable that center-to-center zone plate spacings can be reduced to about .3 mil, or about 100 times closer together than present lens array spacings. Moreover, image defects due to aberrations in a refractive system are great as compared with defect limitations in a diffractive system. On the other hand, the diffraction grating zone plate becomes easier to make as you shorten its focal length, because a shorter focal-length grating has a decreased over-all radius of the ring system. In a zone plate the number $n$ of a zone refers to the number of edges between opaque and clear areas, counting from the center of the zone plate, and the radii of the various zones are by definition proportional to the square root of the number $n$ of the zone. In the above-mentioned exemplary working embodiment of the zone-plate array, the outermost rings are $1/10$ mil in thickness.

In order to provide a better understanding of the zone plate, the following characteristics are discussed. Because of the fact that the alternate transparent and opaque zones of the zone plate must transmit only every-other half-period element of the wave front, the wave-length $\lambda$ of the selected monochromatic light determines the dimensions of the zones whose diameters vary approximately as the square root of the number of the zone starting with the first zone in the center whose outer edge radius is $r_1$, and extending out to a total of N zones to provide a zone plate of overall or outer edge radius R. Then $R=r_1\sqrt{N}$. The focal length of a grating is related to the dimensional value of the radius $r_1$ of the first zone and varies as the square. Therefore focal length$=r_1^2/\lambda$.

Resolving power=2× numerical aperture/λ, where numerical aperture=$R$/focal/length, $=2\sqrt{N}/r_1$.

For a given wavelength λ, the total number N of zones, the value of $r_1$ to be used to provide a grating of total radius R, and the resulting resolving power of the zone plate are all interrelated values. The number of zones, for a certain resolving power, is proportional to the maximum radius R. $N=(\text{Resolving Power})\times R/2$. The radius of the inner zone $r_1=\sqrt{2R/\text{resolving power}}$, so that if resolving power is held constant, the radius $r_1$ is proportional to the $\sqrt{R}$.

The degree of difficulty involved in forming a practical grating is measured by the width of the finest (outermost) zone in the grating which can be photo-etched into a metallic layer on a glass plate, or otherwise formed. The finest line width in the grating itself is twice the width of the narrowest line which the grating is theoretically capable of forming in the image plate. Therefore, on a practical basis, the ultimate limit on resolving power of the grating is not controlled so much by its diameter or focal length, as by the finest line that can be formed into the opaque layer forming the grating. Since this finest line defines the limit of resolution, the total amount of information passing through a given grating is independent of diameter, focal length, or center-to-center array distances.

In general, the aperture number determined by the ratio of diameter to focal length determines the resolving power of any focusing system, and gratings have the advantage that they can be designed for use in making tiny images as required in the present system, which images have greater resolution than those made by conventional lenses of similar aperture number. Moreover, in a grating array, the outermost zone plates can be considerably further off-axis with respect to the object than in lens systems without serious image distortion, whereas lens systems must work with large object distances to minimize off-axis errors. In one present practical system, the object pattern is spaced only about seven inches from the zone plate array, and the outer zone plates are about ¾″ offset from the main axis. The degree to which a zone plate can be moved off-axis without serious detriment increases as the diameter of the zone plate is decreased.

Although as pointed out above, a grating array is easier to manufacture, has a wider angular coverage, and passes more information with higher effective resolving power than a lens array, it requires special provisions for maintaining acceptable image contrasts, in view of the fact that its contrast is about three orders of magnitude poorer than a lens due to the fact that it passes zero-order, first-order, second-order, etc., images which are superposed on each other but in non-registering relationship. If one order of image could be selected to the complete exclusion of other-order images, then the haze contributed by the latter to the detriment of the former would be gone. It is therefore another object of this invention to further improve the present novel zone-plate image-multiplying system by adding means for reducing haze caused by undesired orders of light passing through the gratings in the direction of the image plane.

In a step-and-repeat image multiplier employing only a single lens system mechanically moved from image area to image area, the light source is carried along together with the lens system, but in a system where all components are stationary and the image multiplication is accomplished by multiple zone plate gratings in an array occupying a plane normal to the main instrument axis, it is important to achieve uniformity of lighting for all areas contributing to each image, as well as for all of the images appearing in the image plane. This is true regardless of whether the image plane comprises a photographic film on which plural masks are to be projected, or whether the image plane comprises a photo-resist coated substrate or other image-receiving surface. Since in the present system only one object pattern is used, which pattern is then focused through all of the individual gratings in the array, the light illuminating the object pattern should be uniform everywhere thereon. Moreover, the light leaving the object pattern should be given off thereby uniformly through all angles drawn from any light-radiating point in the pattern to any point in the focusing array. It is preferred in this invention to provide uniform illumination in an image multiplying system of the present type.

Other objects and advantages of the present invention will become apparent during the following discussion of the drawings, wherein.

Figure 1:
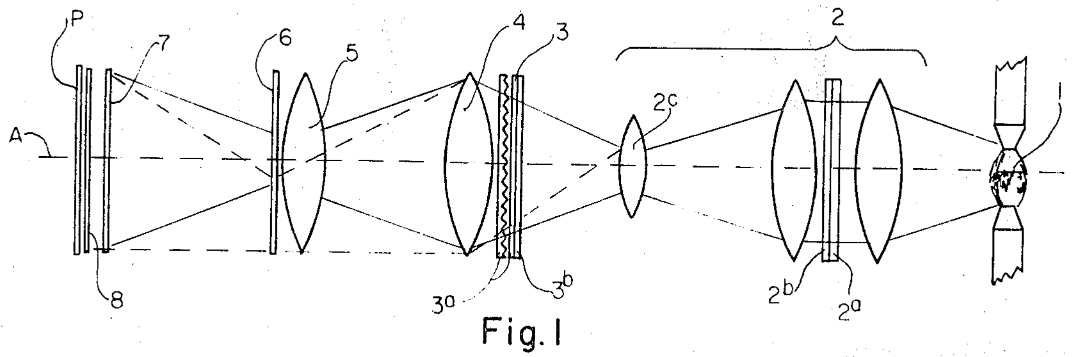
FIG. 1 is a schematic diagram illustrating the location and spacing of the various elements of a simple embodiment of the present invention.
Figure 3:
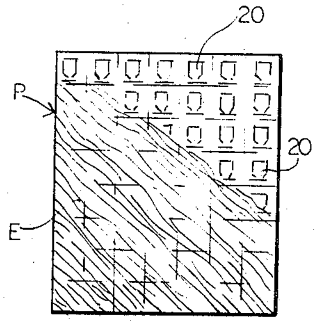
FIG. 3 is an enlarged elevation view showing an image plate having images projected thereon and arranged in a checkerboard pattern defined by the illustrated dashed lines.
Figure 4:
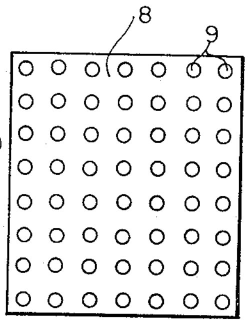
FIG. 4 is a view of a haze mask having an arrangement of holes dimensioned to pass first-order images from the zone plate array.

Referring now to FIG. 1, the illustrative embodiment shown in this figure includes at its right end a light source 1 which in a working embodiment of the invention comprises an electric arc illuminating a first condenser and lens system 2, which includes a heat absorber 2*a* and a narrow band light filter 2*b*, serving to deliver monochromatic light to a first field lens 2*c* which is placed near the image of the arc to eliminate vignetting at the plane of a diffuser means 3. The light then passes through the diffuser means 3 which includes two crossed lenticular plates 3*a*, and a diffusion plate 3*b* having an etched surface. The purpose of the diffuser means 3 is to provide a glowing area whose every surface point emits light having substantially the same intensity as every other point. The light then passes through a second condenser 4 which images the plane of the first field lens through a second field lens 5 and onto the object plate 6 with such distribution as to uniformly illuminate a transparent object pattern plate 6, FIG. 6. The light leaving the object plate 6 then passes through the array of gratings G on the glass plate 7, FIG. 5. Each of these gratings focuses an image of the pattern from the plate 6 upon one zone of the emulsion E on the image plate P, FIG. 3, after the light passes through a haze mask 8, FIG. 4. In a working embodiment of the illustrated system, all of the various plates and lenses 4, 5, 6, 7, 8 and P are approximately the same size, about 1⅜ inches on a side, and this fact points up one of the advantages of the present system, namely that the entire assembly is compact, and can be of a size approximating the outlines shown in the present drawings.

The light source 1, serves to brightly illuminate the diffuser means 3 so that all points thereof give off the same light intensity in the direction of the lenses 4 and 5. The arc light 1 is preferably a monochromatic source, and, if not, is filtered by a multi-layer interference filter 2*b* to remove all but the desired light wavelength. A substantial improvement in operation may be obtained by using a spacially coherent light source such as a laser (not shown), the wavelength of such light source and the zone-plate parameters being related as described hereinabove.

Considering each point on the diffuser means 3 in FIG. 1, as a source of light, each such point should provide uniform illumination to all points on the pattern plate 6. Such a purpose can be accomplished by meeting two conditions. Firstly, all points of the diffuser means 3 should give off light with equal intensities; and second, the light which leaves each point of the diffuser means 3 should be uniform through all angles subtended by the field lens 5. If every point on the diffuser means 3 provides constant light intensity within the subtended angle, then the lens 5 can focus each of these light source points to provide uniform illumination in the plane of the pattern plate 6.

This plate 6 may comprise a glass plate having a photographic representation of a hand-made object pattern photographed thereon by an external camera system. Since only one pattern is to be reduced onto the plate 6 from the hand-made drawing, this pattern can easily be very sharply reproduced thereon. Moreover, any failings of the reduction lens system may be easily compensated for by the artist who draws the original pattern so that after reduction, including unavoidable lens distortions, the final pattern appearing on the plate 6 is substantially perfect. Some of the effects to be corrected for include edge effects of the lens and the effect resulting from large transport areas located next to fine opaque areas, or vice versa. The present system therefore provides illumination of the pattern which is more than mere uniform intensity across the whole plane of the pattern, and includes the feature that the light also leaves the pattern in such a way that all points in the plane of the grating array 7 are uniformly contributed to by each point in the object plane 6. Moreover, it is desirable that the light leaving any point within the object plate 6 should uniformly illuminate the entire area of the zone-plate array 7, which means that the light should not only be uniformly distributed across the plane of the pattern 6, but also that each point in that plane should radiate uniformly through the angle subtended by the zone plate array 7.

The crossed lenticular plates 3*a* contribute to efficient illumination of the object plate 6 in the evenly-distributed fashion which is preferred. A single vertical lenticular plate acts as two prisms superimposed which causes the second condenser 4 to form two images of the field lens in the plane of the object, and side by side. The horizontal lenticular plate produces two more images of the field lens one above the other, to appear in the object plane, thereby in effect providing in that plane four adjacent images. With these four source images on the plane of the object, only a small amount of diffusion is required to obtain quite uniform illumination over the entire object plane 6. Whenever diffusion is utilized, light must be spread out over an area many times that to be covered, if uniform illumination is to be obtained over the "covered" area. With the above lenticular multiple image system, uniformity is obtained with minimum light lost due to scatter outside the desired area.

Figure 5:
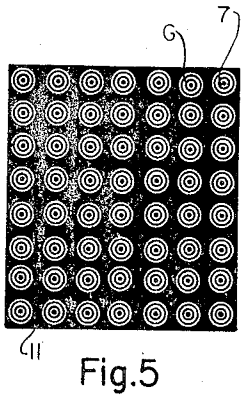
FIG. 5 is a detail view of the image multiplying and focusing array comprising multiple Fresnel zone plates.
Figure 6:
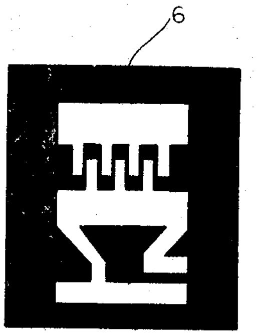
FIG. 6 shows a plate having an object pattern which is intended to be projected upon adjacent image plate areas by the focusing array shown in FIG. 5.
Figures 7, 8:
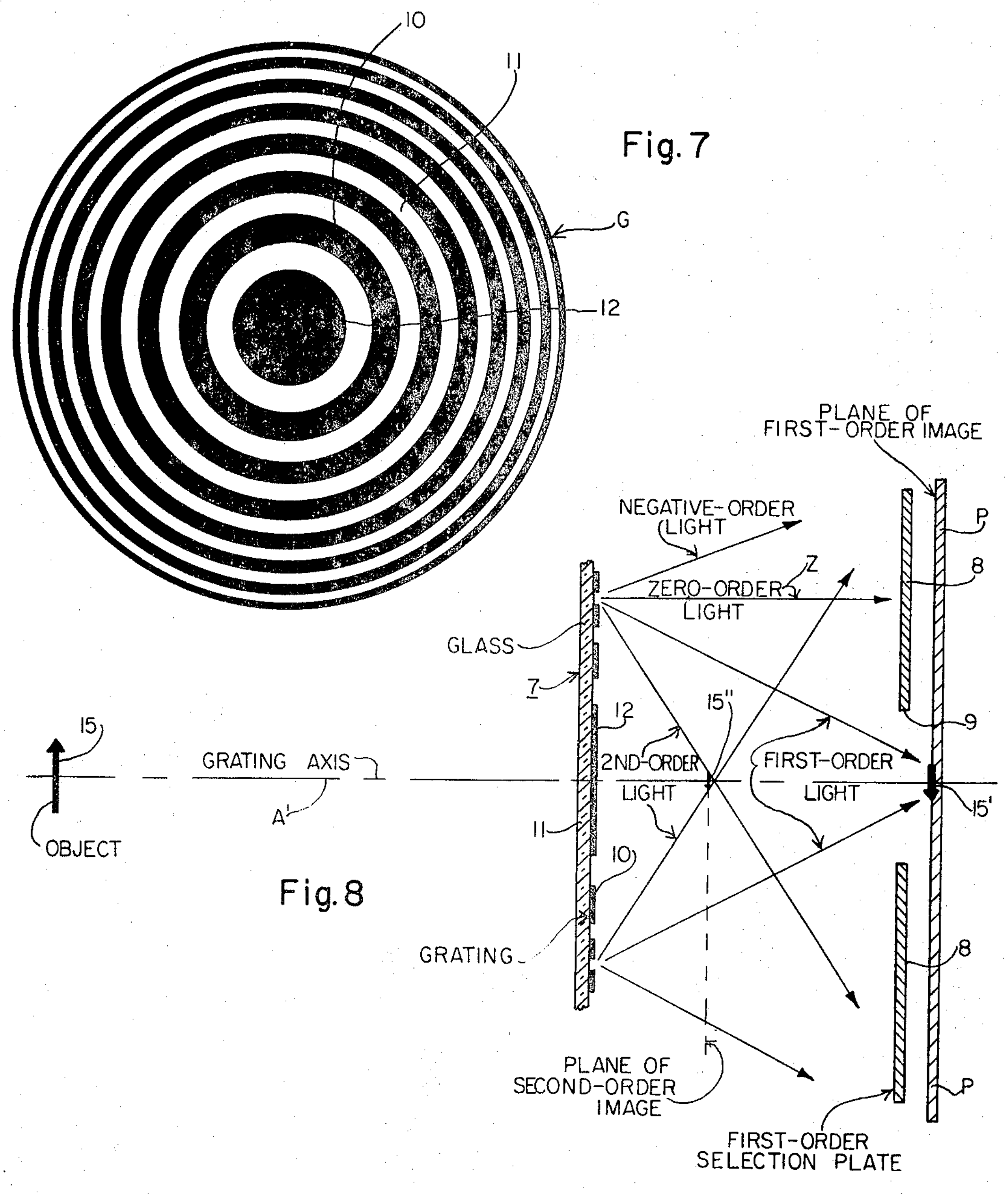
FIG. 7 shows an enlarged view of a zone plate pattern similar to each of the patterns included in the array of FIG. 5 although simplified as to the number of zones illustrated.
FIG. 8 is a diagram illustrating the performance of a first-order selection mask for reducing image haze contributed by other orders of light.

FIGS. 5 and 7 show zone-plate focusing means of the type used in the present invention. As is known in the prior art, each zone plate comprises a grating G of alternate transparent and opaque zones, all of which are of equal area, the areas being related according to Fresnel diffraction theory to the wavelength of light which the zone plate is focusing. In the system illustrated herein the zone plate has the odd-numbered zones opaque. For the purpose of effectively blocking out as much of the zero-order light as possible, the center few clear zones of the zone plates actually used are made opaque, as will be made clearer during the subsequent discussion of FIG. 8. The gratings may conventiently be made, for example, by etching an aluminum coating 10 carried upon a glass plate 11 using known photographic techniques, for instance, of the type discussed in Pat. 3,130,098 to Levengood.

One exemplary focusing array 7 includes 2500 individual Fresnel zone-plate greatings G, each having about 100 zones, and the space between the gratings in the plate being made opaque as appears in FIG. 5. As indicated in the statement of the objects, it is desirable to improve the quality of the images by using gratings having a high numerical aperture, i.e., diameter to focal length. The waste space between zone plates is preferably reduced to a minimum, for instance by having the gratings at least tangent with each other, although such closeness of spacing is, for clarity, not illustrated in FIG. 5.

Figure 2:
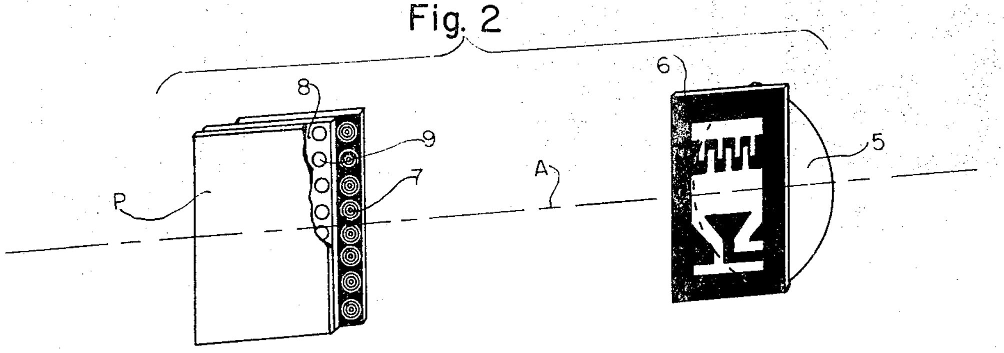
FIG. 2 is a view of the left-half of the embodiment shown in FIG. 1, but illustrating the arrangement of elements in perspective so as to show their character in more detail.

Referring now to FIG. 8, it will be observed that the arrow 15 representing an object-plate pattern lies upon an axis A′ drawn between the arrow and the illustrated Fresnel grating G comprising the etched aluminum pattern 10 on the glass plate 11. Note that the grating axis A′ probably will not correspond with the axis A of the optical system as shown in FIGS. 1 and 2, but that it will in the case of all but the center grating be laterally offset therefrom. Fortunately, the performance of the gratings is not much affected by reasonable offsets from the main axis A of the light source, at least not nearly as much as would be the case with ordinary lenses. The gratings diffract the light rays in such a way that their performance is not severely damaged by having the rays arrive somewhat at an angle to the axis of the grating itself.

At any rate, each grating G passes light to form images of a number of different orders, which images all focus in different planes. There is zero-order light which simply goes straight through the glass plate at the openings of the gratings, and is not diffracted thereby. There is first-order light which passes through the gratings and is focused at what shall be considered for present purposes the main focal length of the grating, thereby providing an arrow 15′ comprising the first order image. There are also a number of higher order images, for instance the second order image 15″ which has a considerably shorter focal length as represented by the lines which are labeled "second-order light" in FIG. 8. There are also third, fourth, and higher order light images whose intensities decrease as the light order increases. Finally, there is negative order light which represents divergent, and therefore non-focusing, rays.

It is the function of the opaque haze plate 8 to block as much as possible the zero-order, negative orders, and all orders of light greater than the desired first order, to prevent it from reaching the plane of the first-order image, which is also the plane P of the photographic emulsion E, while at the same time permitting the first-order light to reach that plane through strategically placed holes 9. While it is obviously not possible to block all of the unwanted orders of light using the illustrated apertured plate 8, it is possible to block most of such light while producing high-contrast images on the emulsion coating E, FIG. 3. By carefully selecting the emulsion characteristics, the exposure time, and the developing time, the hazing effect of the remaining undesired-orders of light can be minimized to the point where it is well within tolerable levels. From the diagram of FIG. 8, it will be seen that by using a Soret type of grating in which the central zone 12 is opaque, most of the zero-order light can be excluded. The opaque central zone 12 of the grating G prevents the zero-order light from falling upon the area of the image plane occupied by the first-order image 15′, and the plate 8 tends to block other zero-order light, such as the light ray Z passing through a transparent outer zone of the grating G, as well as the divergent negative-order light. Fortunately, the intensity on plate P decreases with higher-order images, which fact helps the haze problem. The plate 8 also tends to block light from the second-order, and the third and subsequent orders of images, whose rays cross at even steeper angles and at focal points located closer to the grating G as shown by the second order image 15'. The holes 9 in the plate 8 must, of course, register perfectly with the first-order image positions of the grating plate 7, although this does not necessarily mean that the centers of the holes 9 are concentric with the axes A' through the centers of the gratings G. Because of the offset of most of the grating axes A' from the main instrument axis A, the holes 9 which cooperate with offset gratings will in turn be offset somewhat from the centers of the gratings. Efficient means has been devised for using the grating array 7 to make its own apertured plate 8 while it is in place within the assembled system, and thereby provide accurate registrations of the centers of the holes 9 with respect to the centers of the gratings G in the array plate 7.

The images 20 which are cast upon the surface of the image plane P are all substantially identical with each other, and are certainly mutually similar to a much greater extent than is true with images cast by multiple lens arrays. As long as each different pattern plate 6 is aligned properly with the preceding pattern plate, it follows that all of the multiple images made through the same focusing array will be in perfect registry with each other. Thus, it is only necessary to properly align the pattern plate 6 in order to obtain perfect registry of the 2500 individual images, assuming of course, that the same zone plate array 7 is used. The practical embodiment of the present system has a microscope (not shown) mounted therein for the purpose of viewing one or more images in the plane P, and the system further includes micrometer adjustments (not shown) for precisely aligning each newly inserted pattern plate 6.

This invention is not to be limited to the exact embodiments shown in the drawings, for obviously changes may be made therein within the scope of the following claims.

I claim:

1. In an optical system for simultaneously forming a plurality of essentially identical extended area images, including an extended area object pattern supported in an illuminated object plane disposed normal to an axis of the system, and including an image plane spaced from said object plane along said axis and normal thereto, means for focusing multiple images of said pattern onto said image plane, comprising:
- (a) a transparent plate disposed between said planes and normal to said axis;
- (b) multiple substantially identical image focusing means, all lying in one plane, disposed side-by-side, on said plate in an array clustered about said axis;
- (c) said focusing means, each comprising a zone-plate diffraction grating having alternate opaque and transparent concentric ring zones; and
- (d) means asociated with each said grating for blocking from said image plane substantially all light rays extending through said grating from said object, except those forming a selected order image on said plane of said object.

2. In a system as set forth in claim 1, said transparent plate comprising a flat glass plate and said gratings comprising concentric ring areas in which alternate areas are made opaque by metallic coatings on the glass plate.

3. Focusing means for an optical system used to focus a plurality of identical extended area images on an image plane, comprising:
- (a) a transparent plate;
- (b) a coating on one surface of said plate, the coating being selectively partially removed from the plate to leave adjacent areas comprising alternate light transmissive and opaque zones with a predetermined center area being opaque;
- (c) and said zones mutually forming plural zone-plate diffraction-gratings all lying in one plane disposed side-by-side, the zone plate diameters being of the same order of magnitude as the spacings between zone plate centers.

4. An optical system for focusing onto an image plane multiple substantially identical images each reproducing a common pattern of an extended area object located in an object plane, comprising:
- (a) object plane means supporting said pattern normal to an axis of the system;
- (b) image plane means disposed normal to said axis and spaced from said object means;
- (c) monochromatic light means for illuminating said pattern on the object means;
- (d) an array of image focusing means all lying in one plane disposed normal to said axis and located between said object plane means and said image plane means, and said focusing means being clustered side-by-side about said axis;
- (e) each focusing means comprising diffraction-grating means having alternate opaque and light transmissive zones dimensioned and located to focus monochromatic light emitted from said pattern onto said image plane means to form thereon plural extended area images of one selected order; and
- (f) haze eliminating means located between each grating means and the image plane to intercept non-selected orders of images.

5. An optical system for focusing on to an image plane multiple substantially identical extended area images each reproducing a common extended area object pattern located in an object plane, comprising:
- (a) object plane means supporting said pattern normal to an axis of the system;
- (b) image plane means disposed normal to said axis and spaced from said object means;
- (c) monochromatic light means for illuminating said pattern on the object means;
- (d) an array of image focusing means all lying in one plane disposed normal to said axis and located between said object plane means and said image plane means, and said focusing means being clustered side-by-side about said axis;
- (e) each focusing means comprising diffraction-grating means having alternate opaque and light transmissive zones dimensioned and located to focus monochromatic light emitted from said pattern onto said image plane means to form thereon plural extended area images of one selected order;
- (f) haze eliminating means located between each grating means and the image plane to intercept non-selected orders of images;
- (g) said haze eliminating means comprising an opaque plate having holes therethrough which are respectively located opposite the gratings and are dimensioned to pass light rays forming the selected-order images, but to substantially block light rays of non-selected orders; and
- (h) each grating having its center zone opaque.

6. In a system as set forth in claim 5, the opaque center of each grating being about the same size as the hole in the haze eliminating means thereopposite.

7. In a system as set forth in claim 4, said image plane means comprising an emulsion coated plate located in the focal plane of the desired-order images from said gratings.

8. In a system as set forth in claim 4, said image plane means comprising a substrate having a surface located in the focal plane of the desired-order images from said gratings, and this surface being coated with light-sensitive photo-resist.

9. In a system as set forth in claim 4, said pattern being a transparency, and said light means comprising a light source and means to condense a beam of light therefrom and pass it through the pattern such that all areas of the pattern receive light of uniform intensity and such that light leaving any point in the pattern plane is emitted with uniform intensity through the angle subtended by the focusing means array.

10. In a system as set forth in claim 9, said light source comprising means for generating substantially monochromatic coherent light.

11. In apparatus for manufacturing microcircuit elements, an optical system including an extended area circuit pattern supported in an object plane normal to an axis of the system and including image plane means spaced from said object plane along said axis and normal thereto, means for focusing an image of said pattern on said image plane means, comprising:

(a) an array of image focusing means disposed between said planes forming a zone plate diffraction grating comprising alternate opaque and transparent concentric zones disposed normal to said axis;
(b) the outside diameter of the outermost zone of said grating, being such that the extended area image it produces on the image plane covers an area at least as large as the area enclosed by the outside diameter of said grating, and the spacing between the grating and the image plane being approximately equal to the first-order-image focal length of the grating.

12. In apparatus for manufacturing microcircuit elements, an optical system including an extended area circuit pattern supported in an object plane normal to an axis of the system and including image plane means spaced from said object plane along said axis and normal thereto, means for focusing an extended area image of said pattern on said image plane means, comprising:

(a) an array of image focusing means disposed between said planes forming a zone plate diffraction grating comprising alternate opaque and transparent concentric zones disposed normal to said axis the center zone being opaque;
(b) the outside diameter of the outermost zone of said grating being such that the extended area image it produces on the image plane covers an area at least as large as the area enclosed by the outside diameter of said grating and the spacing between the grating and the image plane being approximately equal to the first-order-image focal length of the grating;
(c) a haze eliminating plate disposed between the grating and the image plane, and closer to the latter and having a hole therethrough concentric with a line drawn between the center of the grating and the center of the first-order image, the diameter of the hole being greater than said central zone but less than the outermost ring.

13. In a system as set forth in claim 11, means for illuminating said pattern with monochromatic light of wavelength λ, and said grating having its *n*th ring comprise the outermost ring of diameter R, and said focal length of the grating being equal to $R^2/n\ \lambda$.

14. In a system as set forth in claim 11, said means comprising an array of multiple gratings clustered side-by-side about said axis and providing a density of at least 1600 such gratings per square inch.

15. In a system as set forth in claim 11, the spacing between said grating and said first order image plane being less than .250 inch.

16. The method of manufacturing multiple microcircuits each involving the successive registering of images from plural common extended area object patterns, with each pattern casting multiple reduced images side-by-side onto an axially-spaced image plane, including the steps of:

(a) uniformly illuminating a first pattern with monochromatic light;
(b) diffracting light emitted from said pattern through an array of multiple focusing locations clustered about said axis and lying in a plane, to cause light diffracted at each location to focus to form on discrete image-plane locations multiple reduced images based on said first pattern;
(c) photographically recording said discrete images in said image plane;
(d) substituting a second related pattern for said first pattern;
(e) aligning the second pattern with respect to said focusing locations so that its diffracted and focused images register relative to said photographically recorded images in said image plane; and
(f) photographically recording said second-pattern in said image plane.

17. An optical system for forming an extended area image of an object extending in an object plane transversely of a reference axis normal to said object plane comprising an image plane normal to said reference axis and spaced therealong from said object plane, a zone plate diffraction grating spaced between said object plane and image plane normal to said reference axis, the area of said grating being about the same order of magnitude as the area of said extended area image.

18. An optical system as defined in claim 17 having means disposed between said grating and said image plane for blocking from said image plane substantially all light rays extending through said grating from said object except those forming a selected order image on said image plane of said object.

19. An optical system as defined in claim 17 having a haze eliminating plate disposed between the grating and the image plane, said plate having a hole therethrough concentric with a line drawn between the center of the grating and the center of the image.

20. An optical system as defined in claim 17 wherein the area of said grating is essentially equal to the area of said extended area image.

References Cited

UNITED STATES PATENTS 3,263,079 7/1966 Mertz et al. --------- 350—162

JOHN M. HORAN, Primary Examiner

R. A. WINTERCORN, Assistant Examiner

U.S. Cl. X.R.

340—173; 350—162